US012569090B2

(12) United States Patent
Gosha et al.

(10) Patent No.: US 12,569,090 B2
(45) Date of Patent: Mar. 10, 2026

(54) SPICE PREPARATION AND STORAGE ASSEMBLY

(71) Applicants: Rickye Gosha, Anderson, IN (US); Montia Hill, Anderson, IN (US)

(72) Inventors: Rickye Gosha, Anderson, IN (US); Montia Hill, Anderson, IN (US)

( * ) Notice: Subject to any disclaimer, the term of this patent is extended or adjusted under 35 U.S.C. 154(b) by 294 days.

(21) Appl. No.: 18/220,732

(22) Filed: Jul. 11, 2023

(65) Prior Publication Data

US 2025/0017422 A1    Jan. 16, 2025

(51) Int. Cl.
*A47J 42/36*    (2006.01)
*A47J 42/46*    (2006.01)
*B65D 1/24*    (2006.01)
*B65D 25/56*    (2006.01)
*B65D 51/24*    (2006.01)

(52) U.S. Cl.
CPC .............. *A47J 42/36* (2013.01); *A47J 42/46* (2013.01); *B65D 25/56* (2013.01); *B65D 51/24* (2013.01); *B65D 2203/04* (2013.01)

(58) Field of Classification Search
CPC .. A47J 42/36; A47J 42/46; A47J 42/38; A47J 42/40
See application file for complete search history.

(56) References Cited

U.S. PATENT DOCUMENTS

| | | | |
|---|---|---|---|
| 9,565,972 B1* | 2/2017 | Ormaza | .................. B02C 18/10 |
| 9,737,092 B2 | 8/2017 | Grumbacher | |
| 10,624,389 B1 | 4/2020 | Salgado | |
| 11,051,657 B2 | 7/2021 | Abehasera | |
| D952,415 S | 5/2022 | Nicolas | |
| 2017/0164786 A1* | 6/2017 | Camitta | ................... A24B 7/06 |
| 2020/0269254 A1* | 8/2020 | Abehasera | .............. A47J 42/16 |
| 2021/0282447 A1* | 9/2021 | Abehasera | .............. A47J 42/46 |
| 2022/0015577 A1 | 1/2022 | Kelson | |
| 2022/0087478 A1 | 3/2022 | Moens | |
| 2022/0175189 A1 | 6/2022 | Davidson | |

FOREIGN PATENT DOCUMENTS

WO    WO2020180665    9/2020

* cited by examiner

*Primary Examiner* — Mohammed S. Alawadi

(57)    ABSTRACT

A spice preparation and storage assembly for includes a cylinder that is comprised of a translucent material and a lid that is removably attachable to the cylinder. A magnifying lens is integrated into the lid to magnify contents of the cylinder. A plurality of caps is provided which includes a grinder cap, a scale cap and a closing cap. The grinder cap has a grinding unit that is rotatably integrated into the grinder cap to grind the contents of the cylinder when the grinder cap is attached to the cylinder and the grinding unit is turned on. A weight sensor is movably integrated into the scale cap to sense the weight of the contents of the cylinder when the scale cap is attached to the cylinder.

12 Claims, 11 Drawing Sheets

SPICE PREPARATION AND STORAGE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to spice preparation devices and more particularly pertains to a new spice preparation device for chopping, weighing and storing herbs and spices. The device includes a cylinder and a lid attachable to the cylinder which has a magnifying lens for viewing an interior of the cylinder. The device includes a grinder unit that is attachable to the cylinder for grinding contents of the cylinder and a scale unit that is attachable to the cylinder for weighting the contents of the cylinder.

(2) Description of Related Art Including Information Disclosed Under 37 CFR 1.97 and 1.98

The prior art relates to spice preparation devices including a variety of spice grinder devices that each at least includes a container and a grinder mechanism for grinding spices and a plant material grinder device that includes a container, a grinder mechanism for grinding plant material and a scale for weighting the plant material. In no instance does the prior art disclose a spice grinder that includes a cylinder, a lid attachable to the cylinder that has a magnifying glass, a grinder attachable to the cylinder and a scale attachable to the cylinder.

BRIEF SUMMARY OF THE INVENTION

An embodiment of the disclosure meets the needs presented above by generally comprising a cylinder that is comprised of a translucent material and a lid that is removably attachable to the cylinder. A magnifying lens is integrated into the lid to magnify contents of the cylinder. A plurality of caps is provided which includes a grinder cap, a scale cap and a closing cap. The grinder cap has a grinding unit that is rotatably integrated into the grinder cap to grind the contents of the cylinder when the grinder cap is attached to the cylinder and the grinding unit is turned on. A weight sensor is movably integrated into the scale cap to sense the weight of the contents of the cylinder when the scale cap is attached to the cylinder.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
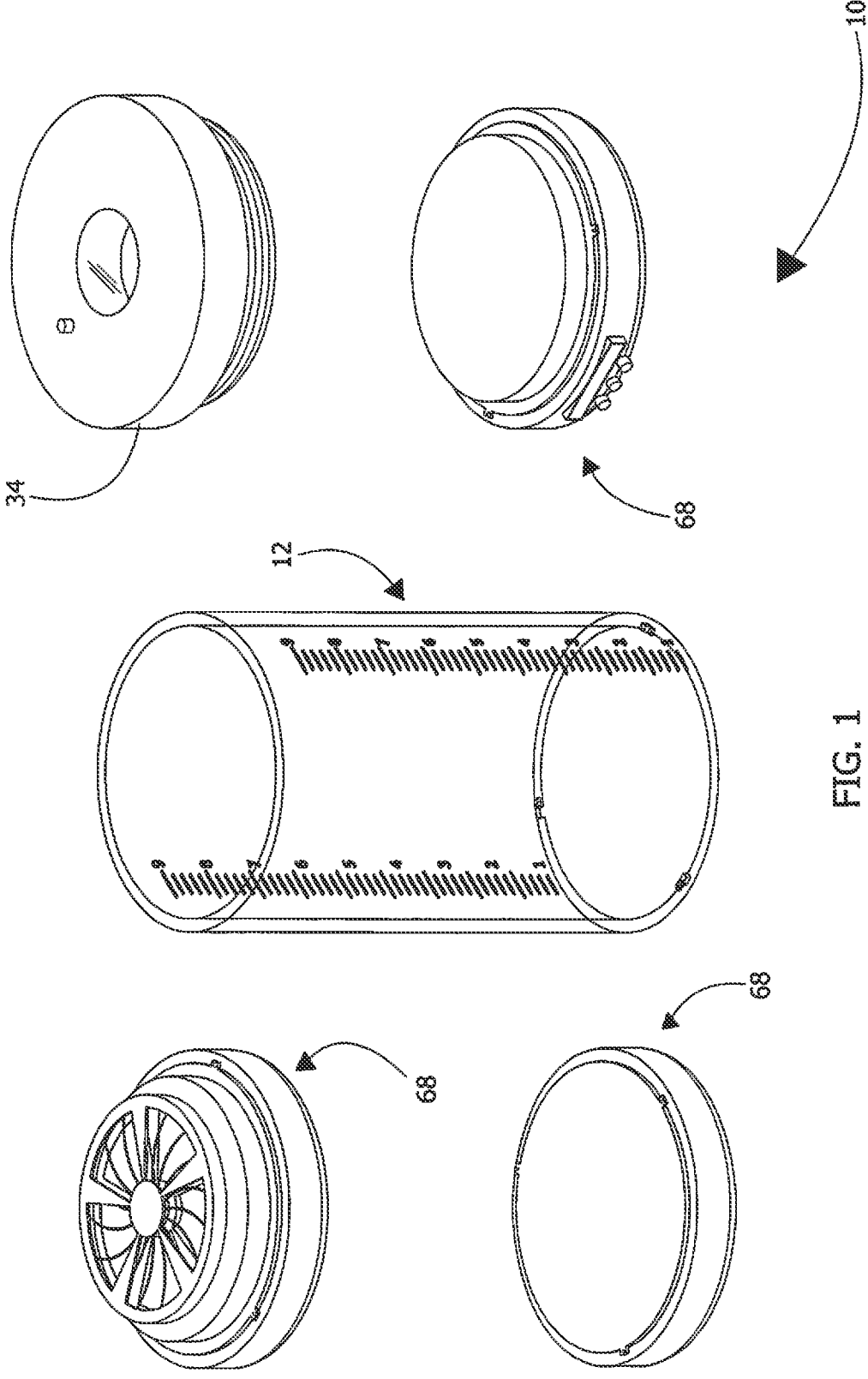
FIG. 1 is a perspective view of a spice preparation and storage assembly according to an embodiment of the disclosure.
Figure 2:
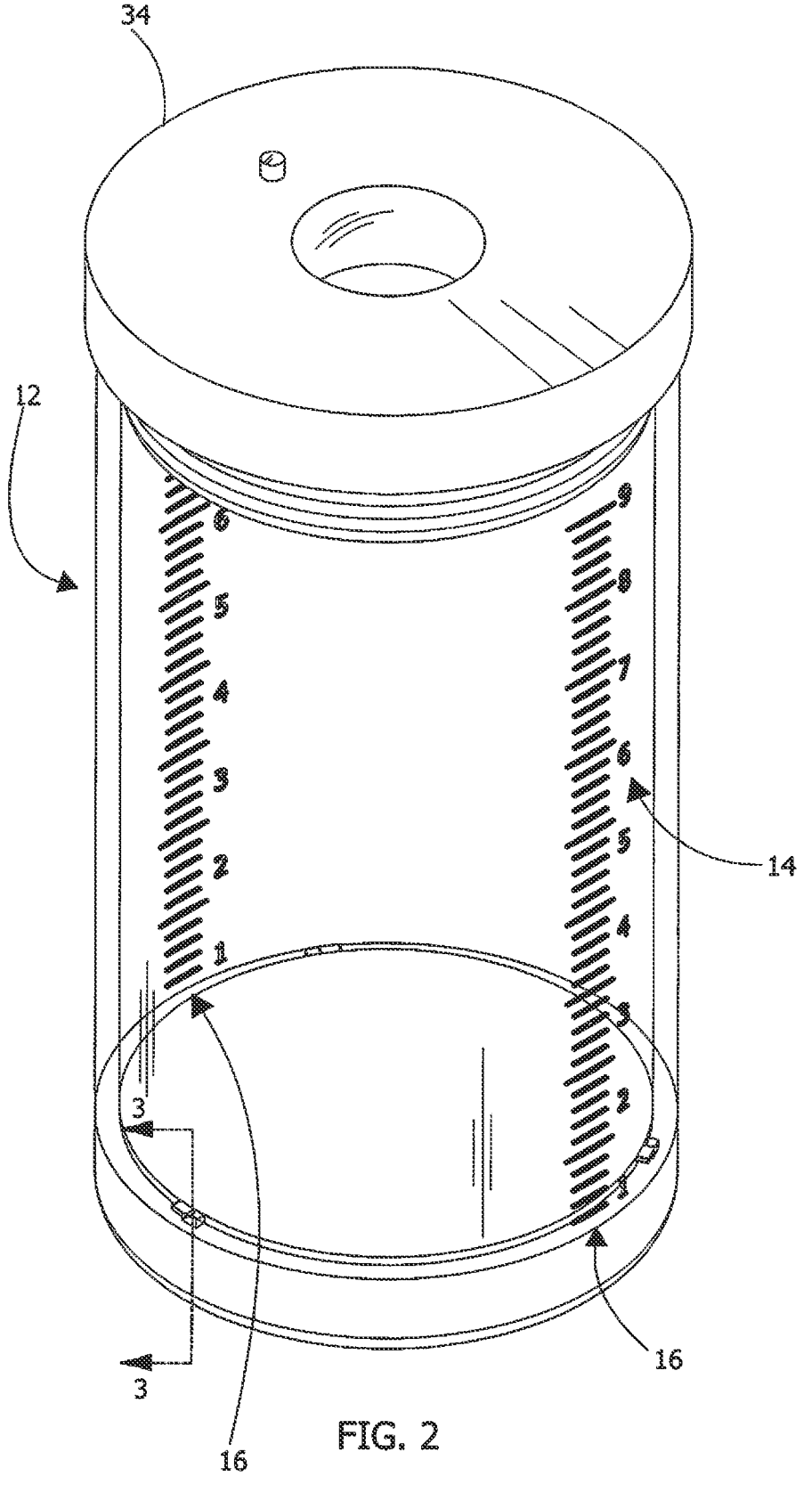
FIG. 2 is a perspective view of an embodiment of the disclosure.
Figure 3:
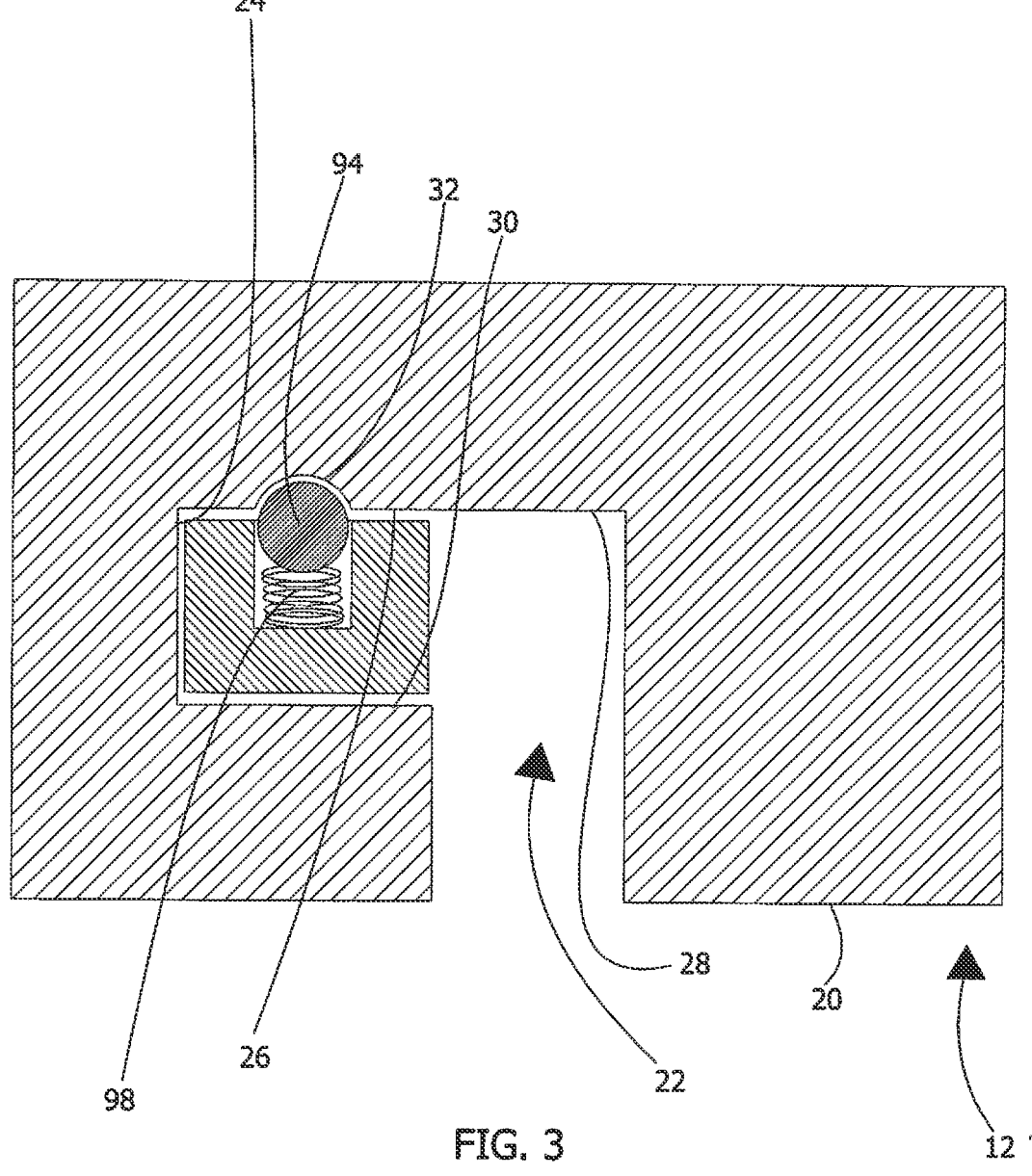
FIG. 3 is a cross sectional view taken along line 3-3 of FIG. 2 of an embodiment of the disclosure.
Figure 4:
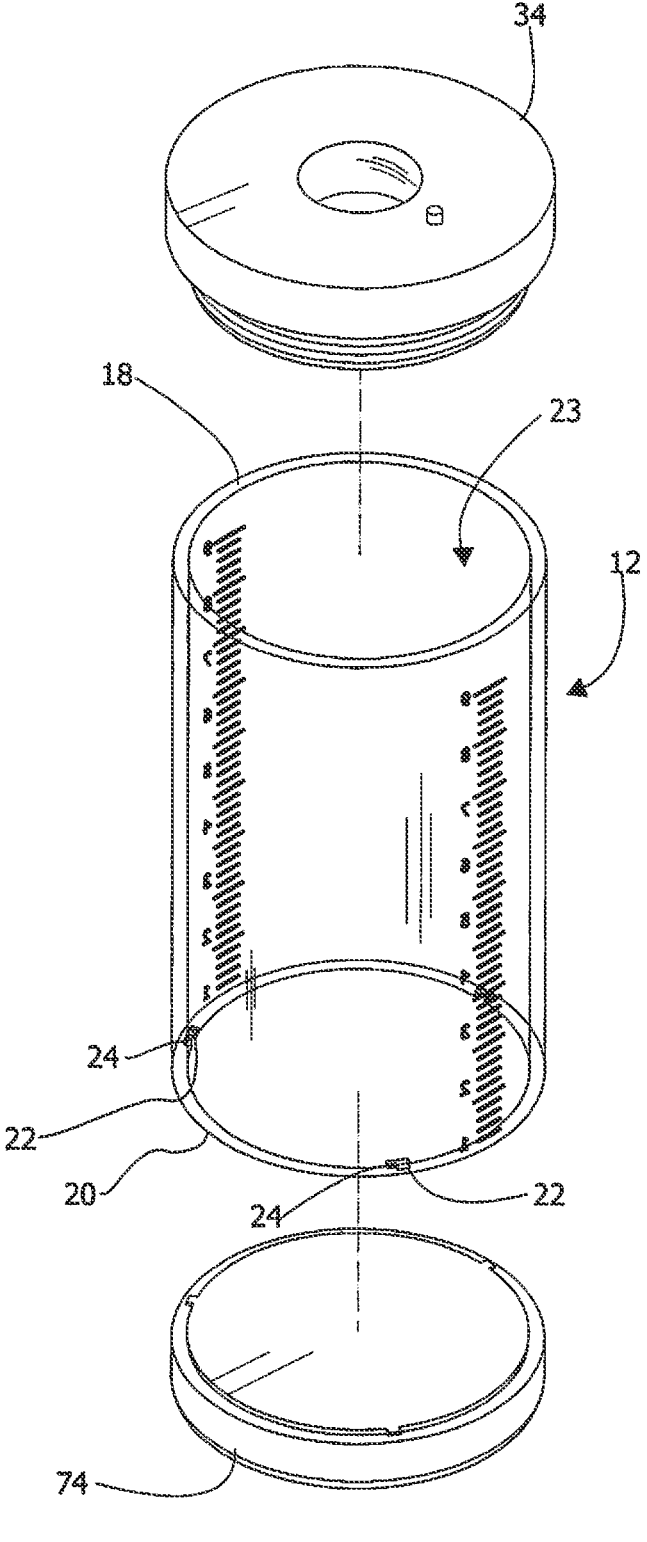
FIG. 4 is an exploded view of an embodiment of the disclosure.
Figure 6:
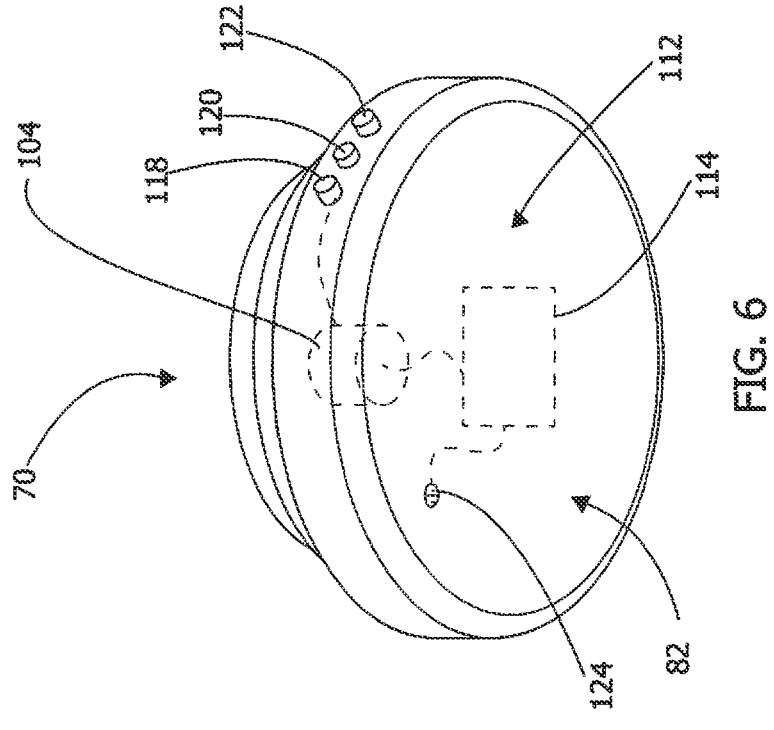
FIG. 6 is a bottom perspective view of a grinder cap of an embodiment of the disclosure.
Figure 5:
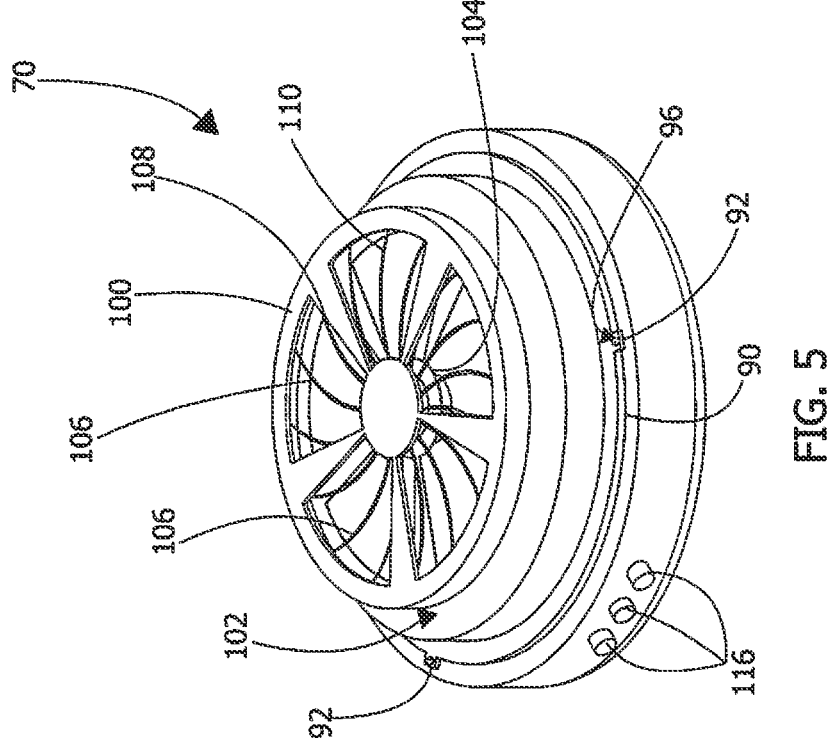
FIG. 5 is a top perspective view of a grinder cap of an embodiment of the disclosure.
Figure 8:
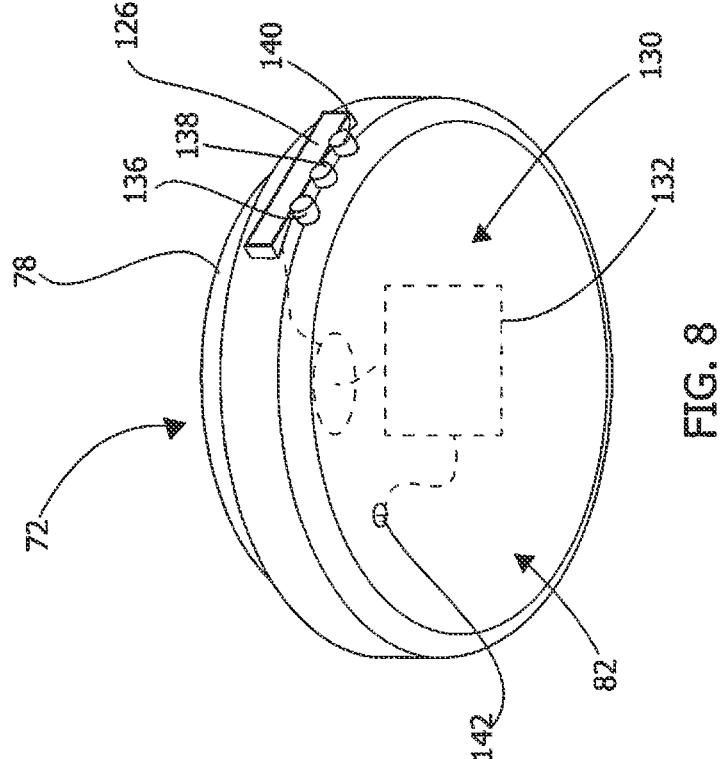
FIG. 8 is a bottom perspective view of a scale cap of an embodiment of the disclosure.
Figure 7:
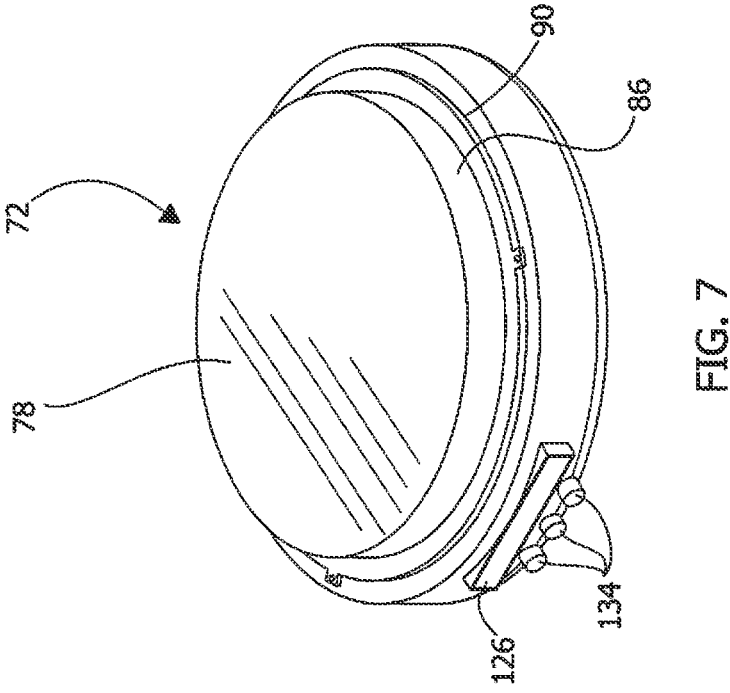
FIG. 7 is a top perspective view of a scale cap of an embodiment of the disclosure.
Figure 10:
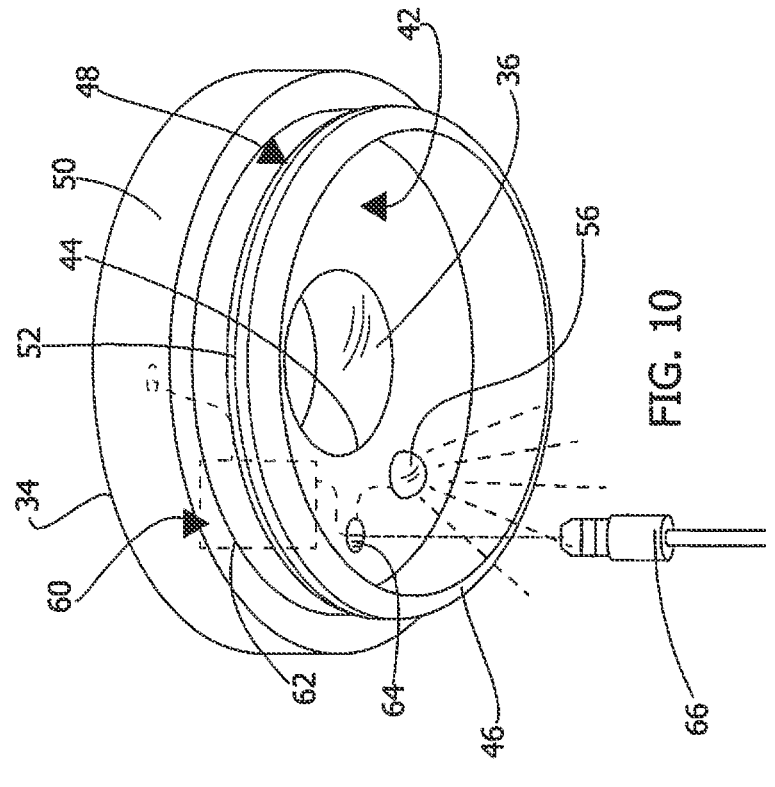
FIG. 10 is a bottom perspective view of a lid of an embodiment of the disclosure.
Figure 9:
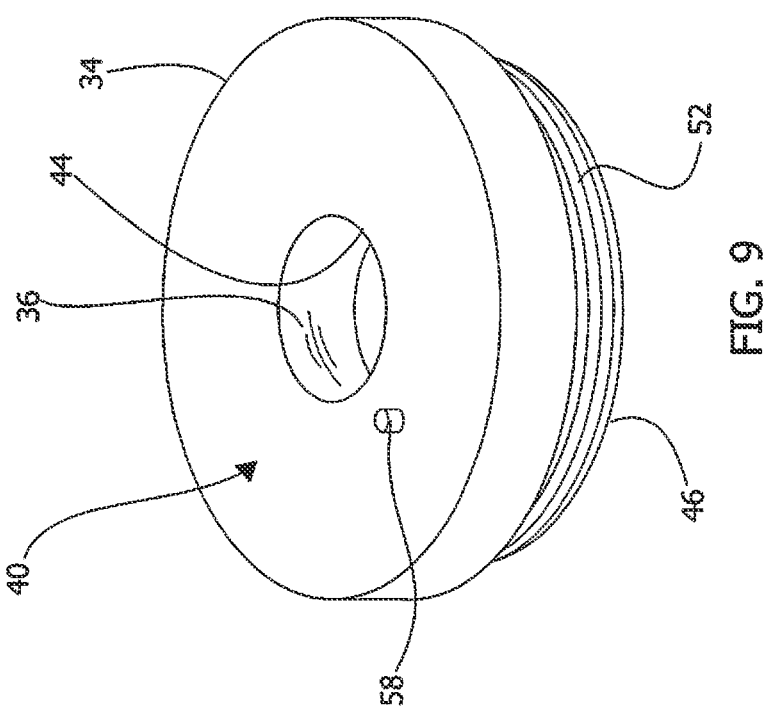
FIG. 9 is a top perspective view of a lid of an embodiment of the disclosure.
Figure 11:
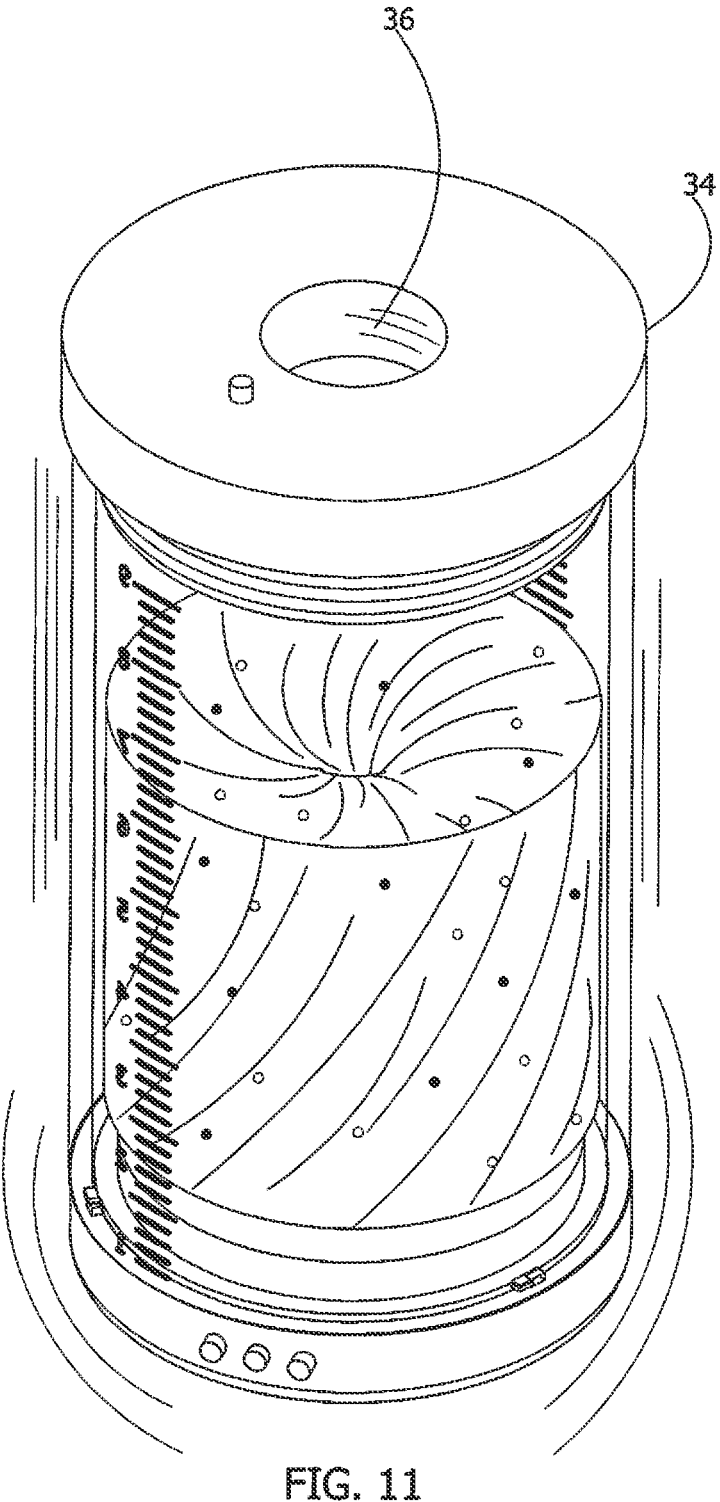
FIG. 11 is a perspective in-use view of an embodiment of the disclosure showing a grinder cap attached to a cylinder.
Figure 12:
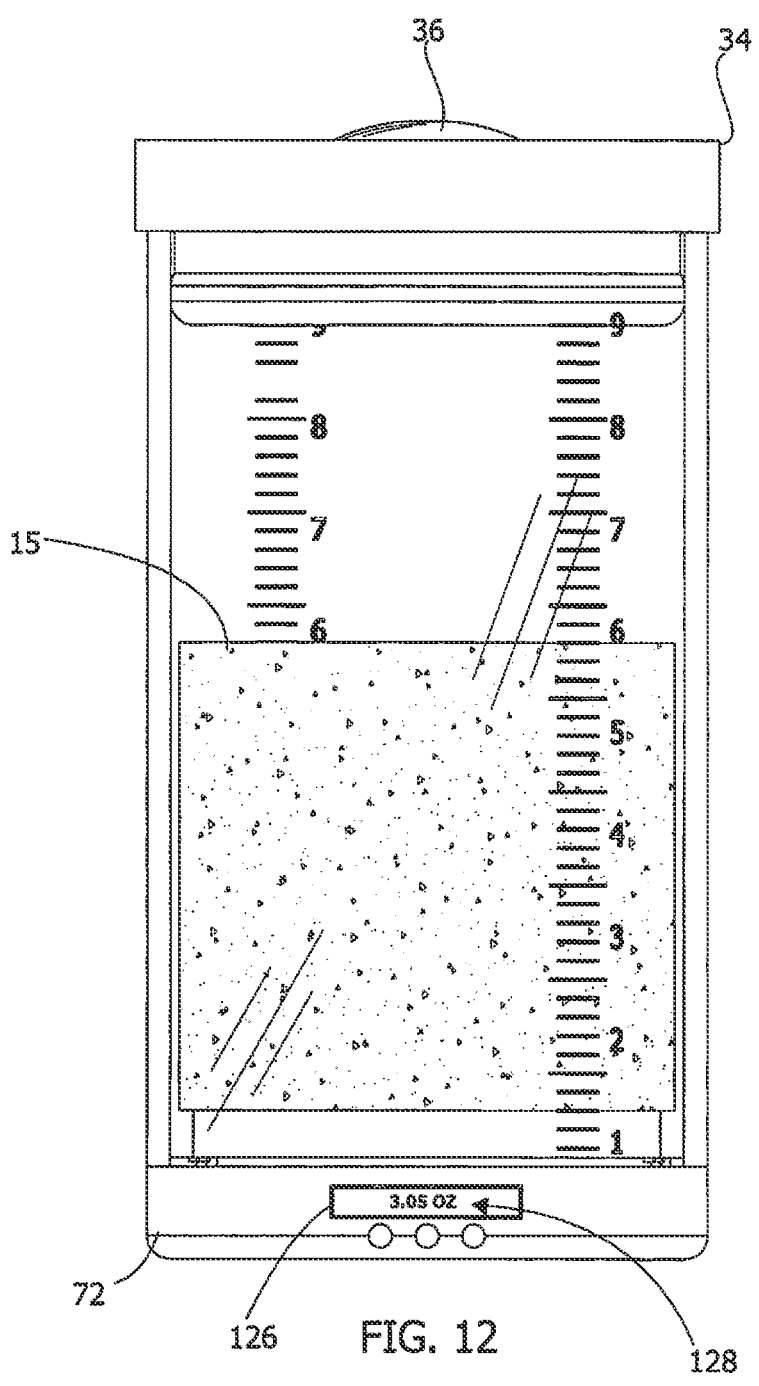
FIG. 12 is a perspective in-use view of an embodiment of the disclosure showing a scale cap attached to a cylinder.
Figure 13:
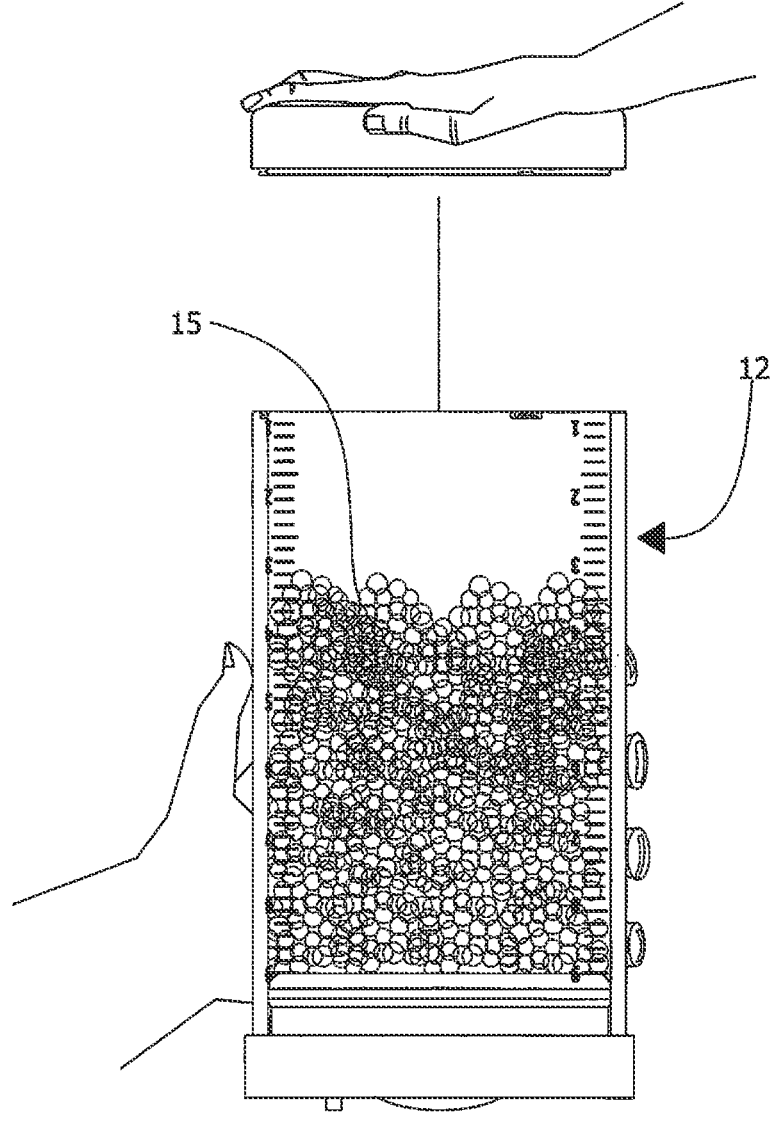
FIG. 13 is a perspective in-use view of an embodiment of the disclosure showing a closing cap being attached to a cylinder.
Figure 14:
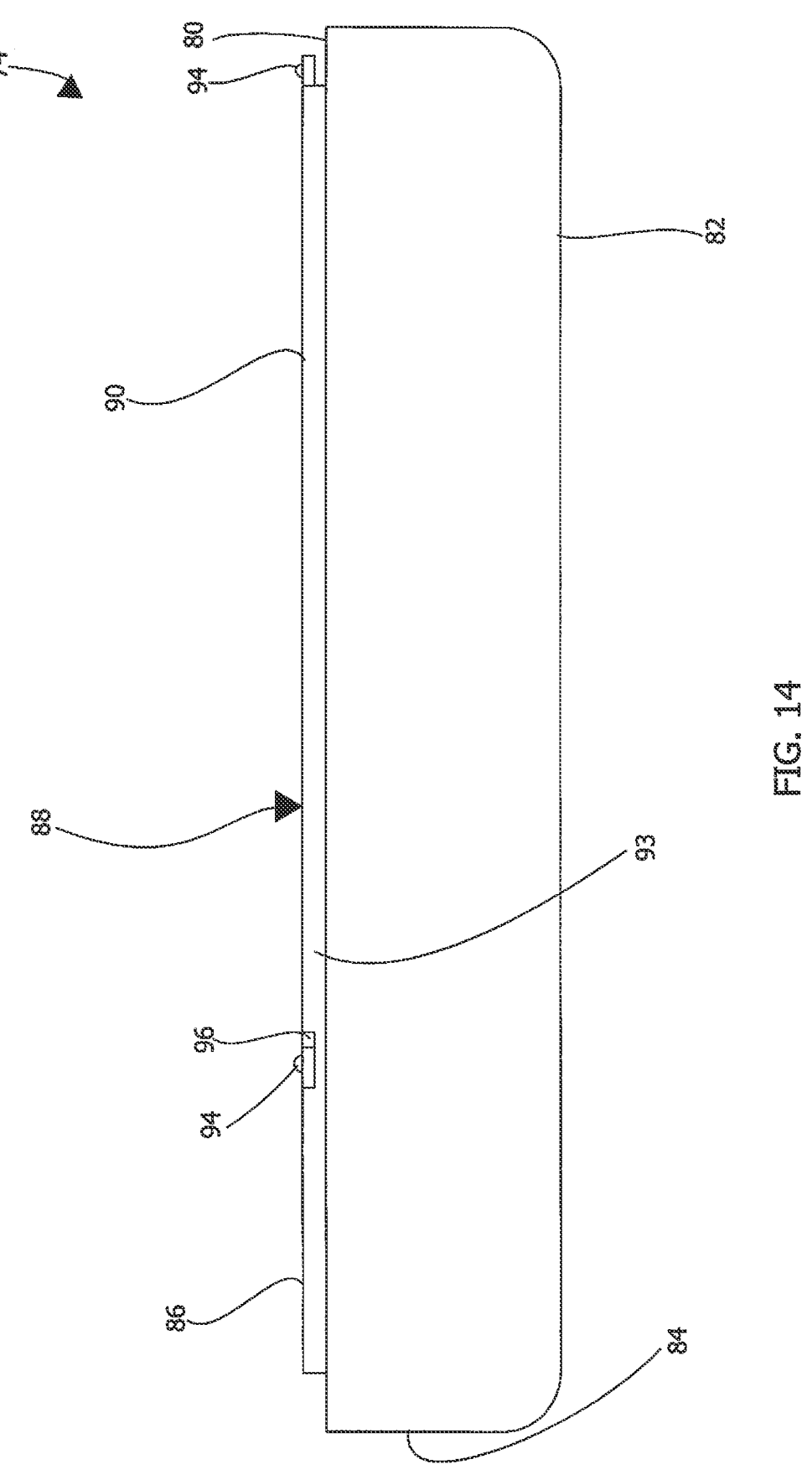
FIG. 14 is a front view of a closing cap of an embodiment of the disclosure.

With reference now to the drawings, and in particular to FIGS. 1 through 14 thereof, a new spice preparation device embodying the principles and concepts of an embodiment of the disclosure and generally designated by the reference numeral 10 will be described.

As best illustrated in FIGS. 1 through 14, the spice preparation and storage assembly 10 generally comprises a cylinder 12 that is comprised of a translucent material to facilitate light to pass through the cylinder 12. Indicia 14 are applied to the cylinder 12 which comprises a graduated scale 16 to facilitate volume of contents 15 of the cylinder 12 to be measured. The indicia 14 may include a pair of the graduated scales 16 positioned on opposite sides of the cylinder 12 with respect to each other. The cylinder 12 has an upper end 18 and a lower end 20 and each of the upper end 18 and the lower end 20 is open.

The cylinder 12 has a plurality of retention wells 22 each extending into the lower end 20 of the cylinder 12 and the retention wells 22 are evenly spaced apart from each other and are distributed around the lower end 20. Additionally, each of the retention wells extends through an interior surface 23 of the cylinder 12. The cylinder 12 has a plurality of chambers 24 each being integrated within the cylinder 12 and each the plurality of chambers 24 intersects a respective one of the retention wells 22. Furthermore, each of the chambers 24 extends through the interior surface 23 of the cylinder 12. Each of the plurality of chambers 24 has an upper bounding surface 26 that is aligned with an upper bounding surface 28 of the respective retention well 22. Each of the plurality of chambers 24 has a lower bounding surface 30 that is spaced upwardly from the lower end 20 of the cylinder 12. Additionally, the upper bounding surface 26 of each of the plurality of chambers 24 has a divot 32 which extends upwardly into the upper bounding surface 24 of the respective chamber 24.

A lid 34 is removably attachable to the cylinder 12 and a magnifying lens 36 is integrated into the lid 34 to magnify contents 15 of the cylinder 12 such that the contents 15 can be clearly seen. The lid 34 has an upper surface 40 and a lower surface 42 and the lid 34 has a hole 44 extending through the upper surface 40 and the lower surface 42. The hole 44 is centrally positioned on the lid 34 and the lid 34 has a lip 46 extending downwardly from the lower surface 42. The lip 46 surrounds the hole 44, the lip 46 has an outwardly facing surface 48 and the lip 46 is spaced inwardly from a perimeter edge 50 of the lid 34 such that the lip 46 and the lid 34 form concentric circles.

A ring 52 is provided which extends around a full circumference of the outwardly facing surface 48. The lip 46 is insertable into the upper end 18 of the cylinder 12 such that the ring 52 frictionally engages an inside surface 54 of the cylinder 12 having the lower surface 42 of the lid 34 resting on the upper end 18 of the cylinder 12. Furthermore, the ring 52 is comprised of a resiliently compressible material such that the ring 52 forms a fluid impermeable seal with the cylinder 12. In this way the ring 52 inhibits the contents 15 of the cylinder 12 from leaking past the lid 34.

A light emitter 56 is integrated into the lower surface of the lid 34 to illuminate an interior of the cylinder 12 when the lid 34 is positioned in the upper end 18 of the cylinder 12 and the light emitter 56 is turned on. The light emitter 56 is positioned between the hole 44 in the lid 34 and the lip 46. Additionally, the light emitter 56 may comprise a light emitting diode or other type of electronic light emitter 56. A light switch 58 is movably integrated into the upper surface of the lid 34 and the light switch 58 is electrically to the light emitter 56. Additionally, the light switch 58 alternatively actuates and de-actuates the light emitter 56 each time the light switch 58 is depressed.

A lid power supply 60 is integrated into the lid 34 and the lid power supply 60 is electrically coupled to the light emitter 56. The lid power supply 60 comprises a rechargeable battery 62 that is integrated into the lid 34 and the rechargeable battery 62 is electrically coupled to the light emitter 56. The lid power supply 60 includes a charge port 64 that is recessed into the lower surface 42 of the lid 34 thereby facilitating the charge port 64 to insertably receive a charge cord 66. The charge port 64 is electrically coupled to the rechargeable battery 62 for charging the rechargeable battery 62.

A plurality of caps 68 is included and a respective one of the plurality of caps 68 is removably attachable to an opposing end of the cylinder 12 with respect to the lid 34. The plurality of caps 68 includes a grinder cap 70, a scale cap 72 and a closing cap 74. The grinder cap 70 has a grinding unit 76 that is rotatably integrated into the grinder cap 70. Furthermore, the grinding unit 76 grinds the contents 15 of the cylinder 12 when the grinder cap 70 is attached to the cylinder 12 and the grinding unit 76 is turned on. The contents 15 may be herbs or spices in vegetable form that need to be ground into a granular form for consuming the herbs or spices for medicinal purposes or for employing the herbs or spices for cooking. The scale cap 72 includes a weight sensor 78 that is movably integrated into the scale cap 72. The weight sensor 78 senses the weight of the contents 15 of the cylinder 12 when the scale cap 72 is attached to the cylinder 12.

Each of the plurality of caps 68 has a top surface 80, a bottom surface 82 and a perimeter surface 84 extending between the top surface 80 and the bottom surface 82. Additionally, each of the plurality of caps 68 includes a prominence 86 extending away from the top surface 80. The prominence 86 is centrally positioned on the top surface 80 having an outer surface 88 of the prominence 86 being spaced inwardly from the perimeter surface 84 of the cap 68. Each of the plurality of caps 68 includes a retention ring 90 that extends around the outer surface 88 of the prominence 86 of a respective cap 68 having the retention ring 90 being spaced from the top surface 80 of the respective cap 68. The retention ring 90 associated with each of the plurality of caps 68 includes a plurality of tabs 92 which each extends outwardly from an outwardly facing edge 94 of the retention ring 90. Furthermore, the tabs 92 are evenly spaced apart from each other and are distributed around a full perimeter of the retention ring 90.

Each of the tabs 92 on the retention ring 90 associated with a respective one of the plurality of caps 68 extends into a respective one of the retention wells 22 in the lower end 20 of the cylinder 12. Additionally, each of the tabs 92 on the retention ring 90 associated with the respective cap 68 travels into a respective one of the plurality of chambers 24 in the cylinder 12 when the respective cap 68 is rotated into a locking position. In this way the respective cap 68 is retained on the lower end 20 of the cylinder 12.

Each of the plurality of caps 68 includes a plurality of balls 94 that is each movably recessed into a top surface 96 of a respective one of the plurality of tabs 92. Each of the balls 94 extends into the divot 32 in the upper bounding surface 26 of a respective one of the chambers 24 when the respective cap 68 is rotated into the locking position. Each of the plurality of caps 68 includes a plurality of biasing members 98 that is each integrated into a respective one of the plurality of tabs 92. Each of the biasing members 98 engages a respective one of the balls 94 for biasing the respective ball 94 outwardly from the respective tab 92. Furthermore, the respective ball 94 is urgeable inwardly on the respective tab 92 when the respective cap 68 is rotated in an unlocking position to facilitate the respective ball 94 to disengage the divot 32 in the upper bounding surface 26 of the respective chamber 24. In this way the respective cap 68 can be removed from the lower end 20 of the cylinder 12.

A grinder unit 100 is rotatably integrated into a topmost surface 102 of the prominence 86 associated with the grinder cap 70. The grinder unit 100 includes a motor 104 and a plurality of blades 106 radiating outwardly from the motor 104. The plurality of blades 106 is rotated to travel in a circle in the grinder unit 100 when the motor 104 is turned on to chop the contents 15 of the cylinder 12 into small pieces. The motor 104 may comprise an electric motor or the like and each of the plurality of blades 106 may be curved between the motor 104 and a distal end 108 of the blades 106. Additionally, a top edge 110 of each of the plurality of blades 106 may be sharpened to facilitate the top edge 110 of each of the plurality of blades 106 to cut and chop the contents 15 of the cylinder 12.

A grinder power supply 112 is integrated into the grinder cap 70 and the grinder power supply 112 is electrically coupled to the motor 104. The grinder power supply 112 comprises a grinder battery 114 that is integrated into the grinder cap 70 and the grinder battery 114 is electrically coupled to the motor 104. A plurality of grinder control buttons 116 is included and each of the grinder control buttons 116 is electrically coupled to the grinder motor 104. The plurality of grinder control buttons 116 includes a low button 118, a high button 120 and an off button 122 for controlling operational parameters of the motor 104. The grinder power supply 112 includes a grinder charge port 124 recessed into the bottom surface 82 of the grinder cap 70 thereby facilitating the grinder charge port 124 to insertably receive a charge cord 66. The grinder charge port 124 is electrically coupled to the grinder battery 114 for charging the grinder battery 114.

The weight sensor 78 is movably integrated into the topmost surface 102 of the prominence 86 associated with the scale cap 72. In this way the weight sensor 78 is positioned inside of the cylinder 12 when the scale cap 72 is attached to the lower end 20 of the cylinder 12. The weight sensor 78 may comprise an electronic weight sensor or the like which has an operational sensitivity ranging between approximately 0.10 grams and 20.0 grams. A display 126 is integrated into perimeter surface 84 of the scale cap 72 and the display 126 is electrically coupled to the weight sensor 78. The display 126 displays indicia 128 comprising numbers to indicate a weight sensed by the weight sensor 78. The display 126 may comprise a light emitting diode display or other type of electronic display.

A scale power supply 130 is integrated into the scale cap 72 and the scale power supply 130 is electrically coupled to the motor 104. The scale power supply 130 comprises a scale battery 132 that is integrated into the scale cap 72 and the scale battery 132 is electrically coupled to the motor 104. A plurality of scale control buttons 134 is each of the scale control buttons 134 is electrically coupled to the scale motor 104. The plurality of scale control buttons 134 includes a low button 136, a high button 138 and an off button 140 for controlling operational parameters of the motor 104. A scale power supply 130 includes a scale charge port 142 recessed into the bottom surface 82 of the scale cap 72 thereby facilitating the scale charge port 142 to insertably receive a charge cord 66. The scale charge port 142 is electrically coupled to the scale battery 132 for charging the scale battery 132.

In use, the grinder cap 70 is attached to the lower end 20 of the cylinder 12 and the contents 15 are poured into the cylinder 12 to facilitate the grinder unit 100 to chop and cut the contents 15 when the grinder unit 100 is turned on. The lid 34 is inserted into the upper end 18 of the cylinder 12 to retain the contents 15 in the cylinder 12. The cylinder 12 can be inverted to facilitate the scale cap 72 to be attached to the lower end 20 of the cylinder 12 for weighing the contents 15 of the cylinder 12. In this way the herbs or spices can be chopped into a granular material and the resulting granular material can be weighed. Additionally, the contents 15 of the cylinder 12 can be viewed through the magnifying lens 36 in the lid 34 for inspecting the contents 15 of the cylinder 12. The closing cap 74 can be attached to the cylinder 12 for storing 52 the contents 15 of the cylinder 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A spice preparation and storage assembly for grinding and weighing herbs and spices, said assembly comprising:
   a cylinder being comprised of a translucent material wherein said cylinder is configured to facilitate light to pass through said cylinder, said cylinder having indicia being applied to said cylinder comprising a graduated scale wherein said graduated scale is configured to facilitate volume of contents of said cylinder to be measured;
   a lid being removably attachable to said cylinder, said lid having a magnifying lens being integrated into said lid wherein said magnifying lens is configured to magnify contents of said cylinder to facilitate the contents to be clearly seen;
   a plurality of caps, a respective one of said plurality of caps being removably attachable to an opposing end of said cylinder with respect to said lid, said plurality of caps including a grinder cap, a scale cap and a closing cap;
   wherein said grinder cap has a grinding unit being rotatably integrated into said grinder cap wherein said grinding unit is configured to grind the contents of said cylinder when said grinder cap is attached to said cylinder and said grinding unit is turned on; and
   wherein said scale cap includes a weight sensor being movably integrated into said scale cap wherein said weight sensor is configured to sense the weight of the contents of said cylinder when said scale cap is attached to said cylinder.

2. The assembly according to claim 1, wherein:
   said cylinder has an upper end and a lower end, each of said upper end and said lower end being open;

said cylinder has a plurality of retention wells each extending upwardly into said lower end of said cylinder, said retention wells being evenly spaced apart from each other and being distributed around said lower end;

said cylinder having a plurality of chambers each being integrated within said cylinder, each said plurality of chambers intersecting a respective one of said retention wells;

each of said plurality of chambers has an upper bounding surface being aligned with an upper bounding surface of said respective retention well;

each of said plurality of chambers has a lower bounding surface being spaced upwardly from said lower end of said cylinder; and said upper bounding surface of each of said plurality of chambers has a divot extending upwardly into said upper bounding surface of said chamber.

3. The assembly according to claim 2, wherein each of said plurality of caps has a top surface, a bottom surface and a perimeter surface extending between said top surface and said bottom surface, each of said plurality of caps including:

a prominence extending away from said top surface, said prominence being centrally positioned on said top surface having an outer surface of said prominence being spaced inwardly from said perimeter surface of said cap;

a retention ring extending around said outer surface of said prominence of a respective cap having said retention ring being spaced from said top surface of said respective cap, said retention ring associated with each of said plurality of caps including a plurality of tabs each extending outwardly from an outwardly facing edge of said retention ring having said tabs being evenly spaced apart from each other and being distributed around a full perimeter of said retention ring, each of said tabs on said retention ring associated with a respective one of said plurality of caps extending into a respective one of said retention wells in said lower end of said cylinder, each of said tabs on said retention ring associated with said respective cap travelling into a respective one of said plurality of chambers in said cylinder when said respective cap is rotated into a locking position for retaining said respective cap on said lower end of said cylinder;

a plurality of balls, each of said balls being movably recessed into a top surface of a respective one of said plurality of tabs, each of said balls extending into said divot in said upper bounding surface of a respective one of said chambers when said respective cap is rotated into said locking position; and a plurality of biasing members, each of said plurality of biasing members being integrated into a respective one of said plurality of tabs, each of said biasing members engaging a respective one of said balls for biasing said respective ball outwardly from said tab, said respective ball being urgeable inwardly on said respective tab when said respective cap is rotated in an unlocking position to facilitate said respective ball to disengage said divot in said upper bounding surface of said respective chamber thereby facilitating said respective cap to be removed from said lower end of said cylinder.

4. The assembly according to claim 1, wherein:

said cylinder has an upper end and an inside surface;

said lid has an upper surface and a lower surface;

said lid has a hole extending through said upper surface and said lower surface, said hole being centrally positioned on said lid;

said lid has a lip extending downwardly from said lower surface, said lip surrounding said hole, said lip having an outwardly facing surface, said lip being spaced inwardly from a perimeter edge of said lid such that said lip and said lid form concentric circles;

said lip has a ring extending around a full circumference of said outwardly facing surface;

said lip being insertable into said upper end of said cylinder such that said ring frictionally engages said inside surface of said cylinder and having said lower surface of said lid resting on said upper end of said cylinder; and said ring is comprised of a resiliently compressible material such that said ring forms a fluid impermeable seal with said cylinder wherein said ring is configured to inhibit the contents of said cylinder from leaking past said lid.

5. The assembly according to claim 4, further comprising a light emitter being integrated into said lower surface of said lid wherein said light emitter is configured to illuminate an interior of said cylinder when said lid is positioned in said upper end of said cylinder and said light emitter is turned on, said light emitter being positioned between said hole in said lid and said lip.

6. The assembly according to claim 5, further comprising a light switch being movably integrated into said upper surface of said lid, said light switch being electrically to said light emitter, said light switch alternatively actuating and de-actuating said light emitter each time said light switch is depressed.

7. The assembly according to claim 5, further comprising a lid power supply being integrated into said lid, said lid power supply being electrically coupled to said light emitter, said lid power supply comprising:

a rechargeable battery being integrated into said lid, said rechargeable battery being electrically coupled to said light emitter; and a charge port being recessed into said lower surface of said lid thereby facilitating said charge port to insertably receive a charge cord, said charge port being electrically coupled to said rechargeable battery for charging said rechargeable battery.

8. The assembly according to claim 1, wherein:

each of said plurality of caps has a bottom surface and a top surface, each of said plurality of caps including a prominence extending upwardly form said top surface; and said grinder unit is rotatably integrated into a topmost surface of said prominence associated with said grinder cap, said grinder unit including a motor and a plurality of blades radiating outwardly from said motor such that said plurality of blades is rotated to travel in a circle in said grinder unit wherein said plurality of blades is configured to chop the contents of said cylinder into small pieces.

9. The assembly according to claim 8, further comprising a grinder power supply being integrated into said grinder cap, said grinder power supply being electrically coupled to said motor, said grinder power supply comprising:

a grinder battery being integrated into said grinder cap, said grinder battery being electrically coupled to said motor;

a plurality of grinder control buttons, each of said grinder control buttons being electrically coupled to said grinder motor, said plurality of grinder control buttons including a low button and a high button and an off button for controlling operational parameters of said motor; and a grinder charge port being recessed into said bottom surface of said grinder cap thereby facilitating said grinder charge port to insertably receive a charge cord, said grinder charge port being electrically coupled to said grinder battery for charging said grinder battery.

10. The assembly according to claim 1, wherein:

each of said plurality of caps has a bottom surface and a top surface, each of said plurality of caps including a prominence extending upwardly form said top surface;

said weight sensor is movably integrated into a topmost surface of said prominence associated with said scale cap such that said weight sensor is positioned inside of said cylinder when said scale cap is attached to said lower end of said cylinder; and a display being integrated into perimeter surface of said scale cap, said display being electrically coupled to said weight sensor, said display displaying indicia comprising numbers to indicate a weight sensed by said weight sensor.

11. The assembly according to claim 8, further comprising a scale power supply being integrated into said scale cap, said scale power supply being electrically coupled to said motor, said scale power supply comprising:

a scale battery being integrated into said scale cap, said scale battery being electrically coupled to said motor;

a plurality of scale control buttons, each of said scale control buttons being electrically coupled to said scale motor, said plurality of scale control buttons including a low button and a high button and an off button for controlling operational parameters of said motor; and a scale charge port being recessed into said bottom surface of said scale cap thereby facilitating said scale charge port to insertably receive a charge cord, said scale charge port being electrically coupled to said scale battery for charging said scale battery.

12. A spice preparation and storage assembly for grinding and weighing herbs and spices, said assembly comprising:

a cylinder being comprised of a translucent material wherein said cylinder is configured to facilitate light to pass through said cylinder, said cylinder having indicia being applied to said cylinder comprising a graduated scale wherein said graduated scale is configured to facilitate volume of contents of said cylinder to be measured, said cylinder having an upper end and a lower end, each of said upper end and said lower end being open, said cylinder having a plurality of retention wells each extending upwardly into said lower end of said cylinder, said retention wells being evenly spaced apart from each other and being distributed around said lower end, said cylinder having a plurality of chambers each being integrated within said cylinder, each said plurality of chambers intersecting a respective one of said retention wells, each of said plurality of chambers having an upper bounding surface being aligned with an upper bounding surface of said respective retention well, each of said plurality of chambers having a lower bounding surface being spaced upwardly from said lower end of said cylinder, said upper bounding surface of each of said plurality of chambers having a divot extending upwardly into said upper bounding surface of said chamber;

a lid being removably attachable to said cylinder, said lid having a magnifying lens being integrated into said lid wherein said magnifying lens is configured to magnify contents of said cylinder to facilitate the contents to be clearly seen, said lid having an upper surface and a lower surface, said lid having a hole extending through said upper surface and said lower surface, said hole being centrally positioned on said lid, said lid having a lip extending downwardly from said lower surface, said lip surrounding said hole, said lip having an outwardly facing surface, said lip being spaced inwardly from a perimeter edge of said lid such that said lip and said lid form concentric circles, said lip having a ring extending around a full circumference of said outwardly facing surface, said lip being insertable into said upper end of said cylinder such that said ring frictionally engages an inside surface of said cylinder and having said lower surface of said lid resting on said upper end of said cylinder, said ring being comprised of a resiliently compressible material such that said ring forms a fluid impermeable seal with said cylinder wherein said ring is configured to inhibit the contents of said cylinder from leaking past said lid;

a light emitter being integrated into said lower surface of said lid wherein said light emitter is configured to illuminate an interior of said cylinder when said lid is positioned in said upper end of said cylinder and said light emitter is turned on, said light emitter being positioned between said hole in said lid and said lip;

a light switch being movably integrated into said upper surface of said lid, said light switch being electrically to said light emitter, said light switch alternatively actuating and de-actuating said light emitter each time said light switch is depressed; and a lid power supply being integrated into said lid, said lid power supply being electrically coupled to said light emitter, said lid power supply comprising:

a rechargeable battery being integrated into said lid, said rechargeable battery being electrically coupled to said light emitter; and a charge port being recessed into said lower surface of said lid thereby facilitating said charge port to insertably receive a charge cord, said charge port being electrically coupled to said rechargeable battery for charging said rechargeable battery;

a plurality of caps, a respective one of said plurality of caps being removably attachable to an opposing end of said cylinder with respect to said lid, said plurality of caps including a grinder cap, a scale cap and a closing cap, said grinder cap having a grinding unit being rotatably integrated into said grinder cap wherein said grinding unit is configured to grind the contents of said cylinder when said grinder cap is attached to said cylinder and said grinding unit is turned on, said scale cap including a weight sensor being movably integrated into said scale cap wherein said weight sensor is configured to sense the weight of the contents of said cylinder when said scale cap is attached to said cylinder, each of said plurality of caps having a top surface, a bottom surface and a perimeter surface extending between said top surface and said bottom surface, each of said plurality of caps including:

a prominence extending away from said top surface, said prominence being centrally positioned on said top surface having an outer surface of said prominence being spaced inwardly from said perimeter surface of said cap;

a retention ring extending around said outer surface of said prominence of a respective cap having said retention ring being spaced from said top surface of said respective cap, said retention ring associated with each of said plurality of caps including a plurality of tabs each extending outwardly from an outwardly facing edge of said retention ring having said tabs being evenly spaced apart from each other and being distributed around a full perimeter of said retention ring, each of said tabs on said retention ring associated with a respective one of said plurality of caps extending into a respective one of said retention wells in said lower end of said cylinder, each of said tabs on said retention ring associated with said respective cap travelling into a respective one of said plurality of chambers in said cylinder when said respective cap is rotated into a locking position for retaining said respective cap on said lower end of said cylinder;

a plurality of balls, each of said balls being movably recessed into a top surface of a respective one of said plurality of tabs, each of said balls extending into said divot in said upper bounding surface of a respective one of said chambers when said respective cap is rotated into said locking position; and a plurality of biasing members, each of said plurality of biasing members being integrated into a respective one of said plurality of tabs, each of said biasing members engaging a respective one of said balls for biasing said respective ball outwardly from said tab, said respective ball being urgeable inwardly on said respective tab when said respective cap is rotated in an unlocking position to facilitate said respective ball to disengage said divot in said upper bounding surface of said respective chamber thereby facilitating said respective cap to be removed from said lower end of said cylinder;

wherein a grinder unit is rotatably integrated into a topmost surface of said prominence associated with said grinder cap, said grinder unit including a motor and a plurality of blades radiating outwardly from said motor such that said plurality of blades is rotated to travel in a circle in said grinder unit wherein said plurality of blades is configured to chop the contents of said cylinder into small pieces;

a grinder power supply being integrated into said grinder cap, said grinder power supply being electrically coupled to said motor, said grinder power supply comprising:

a grinder battery being integrated into said grinder cap, said grinder battery being electrically coupled to said motor;

a plurality of grinder control buttons, each of said grinder control buttons being electrically coupled to said grinder motor, said plurality of grinder control buttons including a low button and a high button and an off button for controlling operational parameters of said motor; and a grinder charge port being recessed into said bottom surface of said grinder cap thereby facilitating said grinder charge port to insertably receive a charge cord, said grinder charge port being electrically coupled to said grinder battery for charging said grinder battery;

wherein said weight sensor is movably integrated into a topmost surface of said prominence associated with said scale cap such that said weight sensor is positioned inside of said cylinder when said scale cap is attached to said lower end of said cylinder;

a display being integrated into perimeter surface of said scale cap, said display being electrically coupled to said weight sensor, said display displaying indicia comprising numbers to indicate a weight sensed by said weight sensor; and a scale power supply being integrated into said scale cap, said scale power supply being electrically coupled to said motor, said scale power supply comprising:

a scale battery being integrated into said scale cap, said scale battery being electrically coupled to said motor;

a plurality of scale control buttons, each of said scale control buttons being electrically coupled to said scale motor, said plurality of scale control buttons including a low button and a high button and an off button for controlling operational parameters of said motor; and a scale charge port being recessed into said bottom surface of said scale cap thereby facilitating said scale charge port to insertably receive a charge cord, said scale charge port being electrically coupled to said scale battery for charging said scale battery.

* * * * *